(12) United States Patent
Swaminathan et al.

(10) Patent No.: US 9,208,402 B2
(45) Date of Patent: Dec. 8, 2015

(54) FACE MATCHING FOR MOBILE DEVICES (71) Applicant: Honeywell International Inc., Morris Plains, NJ (US)

(72) Inventors: Gurumurthy Swaminathan, Bangalore (IN); Saad J. Bedros, West St. Paul, MN (US); Vinod Pathangay, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/227,911

(22) Filed: Mar. 27, 2014

(65) Prior Publication Data

US 2014/0294300 A1    Oct. 2, 2014

Related U.S. Application Data

(60) Provisional application No. 61/806,240, filed on Mar. 28, 2013, provisional application No. 61/807,206, filed on Apr. 1, 2013.

(51) Int. Cl.
*G06K 9/00* (2006.01)
*G06K 9/62* (2006.01)
*G06K 9/46* (2006.01)

(52) U.S. Cl.
CPC .......... *G06K 9/6212* (2013.01); *G06K 9/00288* (2013.01); *G06K 2009/4666* (2013.01)

(58) Field of Classification Search
CPC ............ G06K 9/6217; G06K 9/00248; G06K 9/00268; G06K 9/6255; G06K 9/6232; G06K 9/6212; G06K 9/6202; G06K 9/4647; G06K 9/0061; G06K 9/00281; G06K 9/00288; G06K 9/00221; G06K 9/00295; G06K 2009/4666; G06K 9/00
USPC ......................................................... 382/170
See application file for complete search history.

(56) References Cited

U.S. PATENT DOCUMENTS

| | | | | |
|---|---|---|---|---|
| 8,331,698 | B2 * | 12/2012 | Li ................................. | 382/224 |
| 2007/0160308 | A1 * | 7/2007 | Jones et al. .................... | 382/260 |
| 2010/0008550 | A1 * | 1/2010 | Dinerstein et al. ............ | 382/118 |
| 2012/0288167 | A1 * | 11/2012 | Sun et al. ....................... | 382/118 |
| 2013/0308855 | A1 * | 11/2013 | Li ................................. | 382/159 |
| 2014/0050372 | A1 * | 2/2014 | Qi et al. ......................... | 382/118 |

\* cited by examiner

*Primary Examiner* — Ali Bayat
(74) *Attorney, Agent, or Firm* — Schwegman Lundberg & Woessner, P.A.

(57) ABSTRACT

A method includes receiving an image of a face to match with images of known faces, extracting blocks multiple blocks from the received image, calculating local binary pattern histograms for each block, generating matching scores for each block against block of the images of known faces, determining a top number, N, of matching scores less than the number of blocks, and matching the received image to an image of a known face as a function of the top number of matching scores.

16 Claims, 6 Drawing Sheets

FACE MATCHING FOR MOBILE DEVICES

RELATED APPLICATION

This application claims priority to U.S. Provisional Application Ser. No. 61/806,240 (entitled A system and method for face Matching for mobile devices, filed Mar. 28, 2013), and to U.S. Provisional Application Ser. No. 61/807,206 (entitled A system and method for face Matching for mobile devices, filed Apr. 1, 2013) which are incorporated herein by reference.

BACKGROUND

Face recognition for access control is typically run on an embedded system with typically low computing power capability. There is a tradeoff for each of the embedded system's modules between accuracy, real time processing and computing power. It is challenging given the cost sensitivity of the whole system.

Face based biometrics have been developed for surveillance applications for quite some time. The application developed for a surveillance domain cannot be used directly for access control as it is a solution requiring high end computational power.

SUMMARY

A method includes receiving an image of a face to match with images of known faces, extracting multiple blocks from the received image, calculating local binary pattern histograms for each block, generating matching scores for each block against blocks of the images of known faces, determining a top number, N, of matching scores less than the number of blocks, and matching the received image to an image of a known face as a function of the top number of matching scores.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Access control based, face matching applications for mobile devices should be fast, demanding minimal computational power, and occupy less memory while keeping an acceptable performance. A light-weight face matching application uses Local Binary Pattern (LBP) processing for matching. LBP processing can be performed fast and is lightweight making it an attractive solution for the access control solutions.

An access control face matching application makes use of multiple blocks that are extracted from a face image and multiple LBP histograms computed for each block. These histograms are then compared to generate matching scores for each block. Traditionally, the matching score is either summed up or the maximum value is used as the score for the whole face. In one embodiment a top N % of the scores are used. This approach increases the matching accuracy of the algorithm. The parameter N can be determined based on the application, size of the face and other characteristics of the face image.

The face image is first aligned so that the eyes are at the same position in all the images. However, due to error in landmark detection (eye detection), misalignment errors will exist in the aligned image. Misalignment greatly reduces the performance of the matching engine. An entropy measure is used to identify the misalignment of face images and reject the face images that have large misalignment error.

The effect of misalignment error can further be reduced by ingesting multiple templates into a database for the same face image by perturbing the landmark position before alignment. This will introduce artificial misalignment errors in the stored templates. When the probe image is matched, the probability of a good match increases even when there is misalignment due to landmark detection error. This approach improves the accuracy of the matching; however, it also increases the processing time.

For e.g., for a 3×3 neighborhood misalignment, 81 additional templates are to be matched. An efficient algorithm finds the best approximate score by searching for the best match in each direction independently. This reduces the number of matches from 81 to approximately 6. The above mentioned enhancements can be used along with a matching algorithm on embedded devices.

EXAMPLE EMBODIMENTS

Subset of scores: Use of a subset of scores for matching. The subset size can be dynamically determined based on various factors such as feature scale, resolution of the image, matching scenario, etc.

Entropy for detecting misalignment: Use of entropy as a relative measure of misalignment. This relative measure can be used on the set of input face images to select the best aligned image Efficient search for matching: Procedure to efficiently search for matching faces with perturbation.

Figure 1:
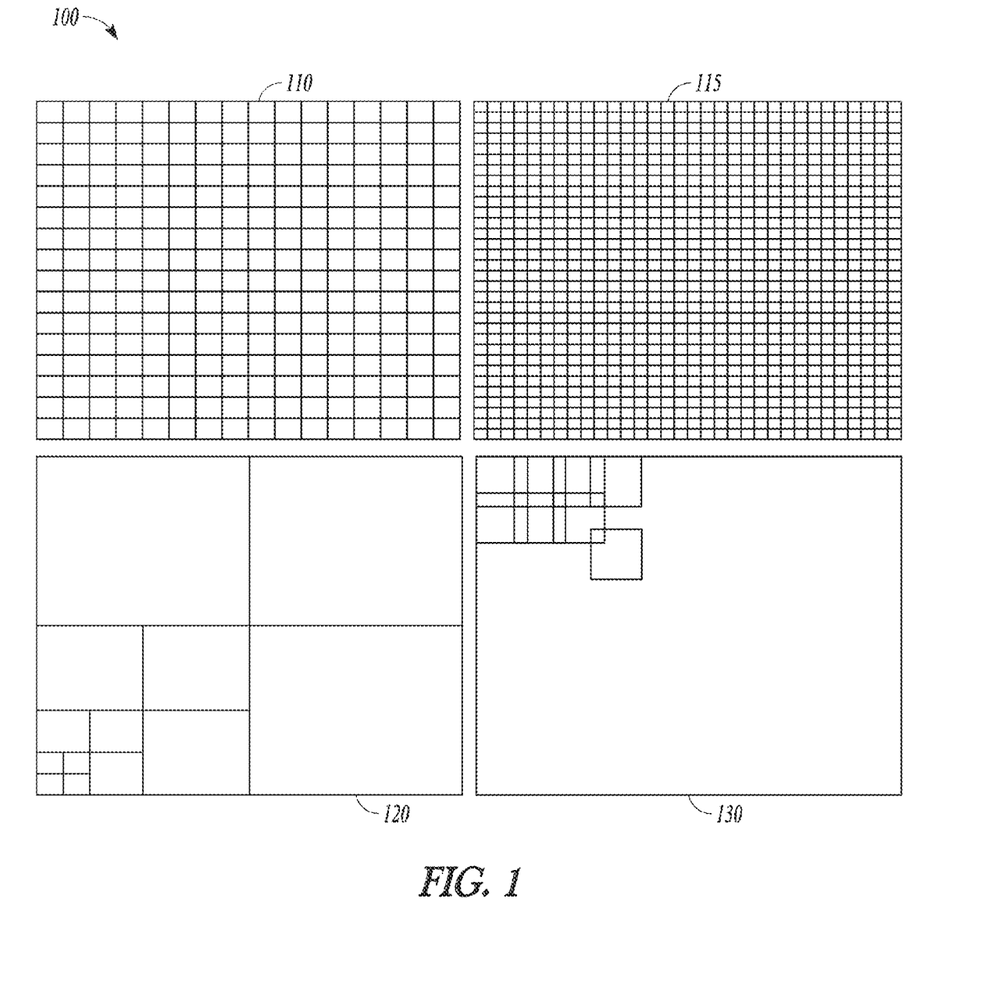
FIG. 1 illustrates a grid of overlapping and non-overlapping blocks of an input face image according to an example embodiment.

In one embodiment, the top N % of scores may be used for matching. The input face image is divided into multiple overlapping and non-overlapping blocks as illustrated at 100. The blocks can be either placed as a uniform grid 110, 115, a hierarchal grid 120 with overlapping or non-overlapping blocks, or a non-overlapping grid indicated at 130. The uniform grid 110 and 115 may have different size blocks as shown, representing different levels of granularity.

LBP features may be computed across the image and histograms of the LBP features may be computed within each block. Thus a face image will generate multiple histograms corresponding to the number of blocks in the image. These histograms are then individually compared with the corresponding histograms of a probe face generating multiple scores.

The scores thus generated can be combined together in multiple ways for generating the final score. The final score can be a sum of all the scores, a minimum of all scores, a median score, or a sum of the top N % of scores. For the sum of the top N % of scores, the scores are sorted and the sum of top N % scores is used as the final score. The parameter N can be determined based on resolution of the input, where for lower resolutions N can be set higher than for higher resolutions, or may be determined based on face alignment, where N can be set depending on the landmark localization error. The higher the error, more blocks should be taken into account for matching.

In a further embodiment, an entropy measure is used to determine a relative misalignment. The entropy measure may be calculated based on the set of aligned images used for training. Define $D_i(k)$ as probability of kth element in the distribution at the ith pixel of the distribution field. The probability is then calculated in accordance with $$D_i(k) = \frac{1}{N}\sum_j x_i'(k).$$

The entropy is defined as $$H(D_i) = -\sum_k D_i(k)\log_2 D_i(k) \qquad (1)$$

The entropy directly provides an estimate of the misalignment. In one embodiment, the entropy measure is used to sort the input faces and chose the best face based on least entropy. The least entropy should provide the best aligned face.

Figure 2:
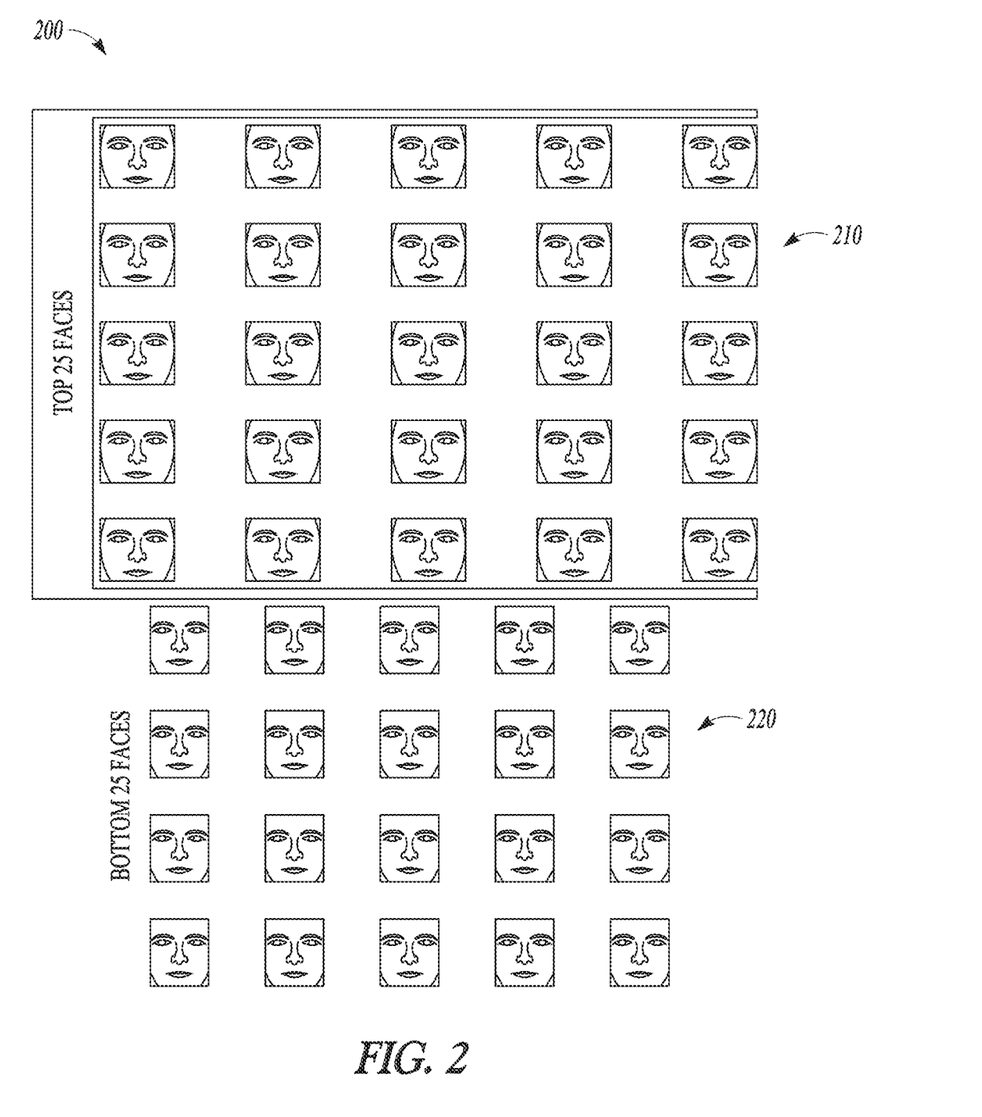
FIG. 2 illustrates an example sorting of a top group and a bottom group of faces by entropy measure according to an example embodiment.
Figure 3:
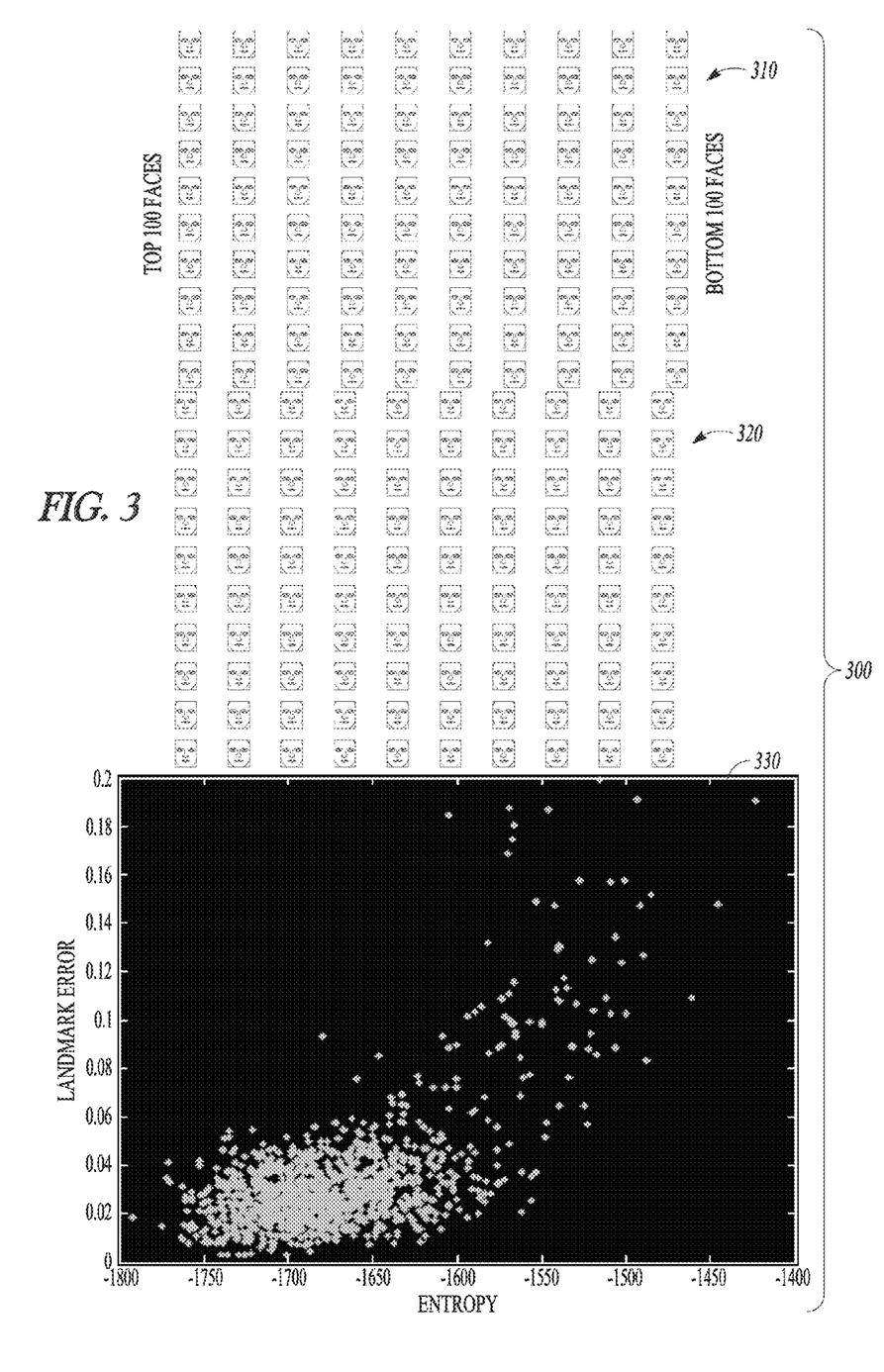
FIG. 3 is a graph and sorted list of face images illustrating entropy versus landmark localization error according to an example embodiment.

FIG. 2 at 200 illustrates a top 25 set of faces at 210 and a bottom 25 set of faces at 220 by entropy measure. FIG. 3 at 300 illustrates aligned entropy lists with a top 100 faces at 310, a bottom 100 faces at 320, and an entropy versus landmark localization error graph at 330.

Figure 4:
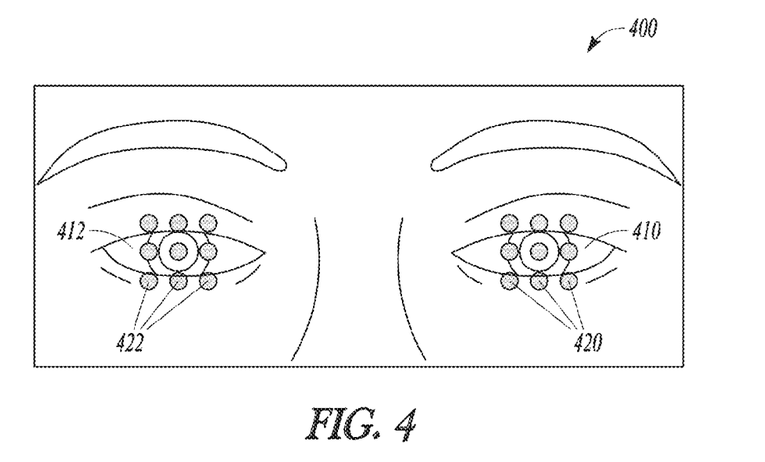
FIG. 4 is a picture illustrating a perturbation grid according to an example embodiment.

A perturbation approach is used for optimal face matching as illustrated at 400 in FIG. 4. The basic idea is to perturb a detected landmark position, such as eyes 410 and 412 in a grid and generate templates for each perturbed position. When a face template is generated and ingested into the database, the detected landmark position is perturbed by N pixels on all sides (for both eyes 410, 412) and templates are generated and stored. Perturbation by 3 pixels on both sides is illustrated at 420 and 422, corresponding to eyes 410 and 412. The reference numbers only point to one side of the perturbation pixels in FIG. 4 to simplify the drawing. When a probe face is matched, it is then matched with all the templates and the maximum (or minimum) score is used as the matching score.

Figure 5:
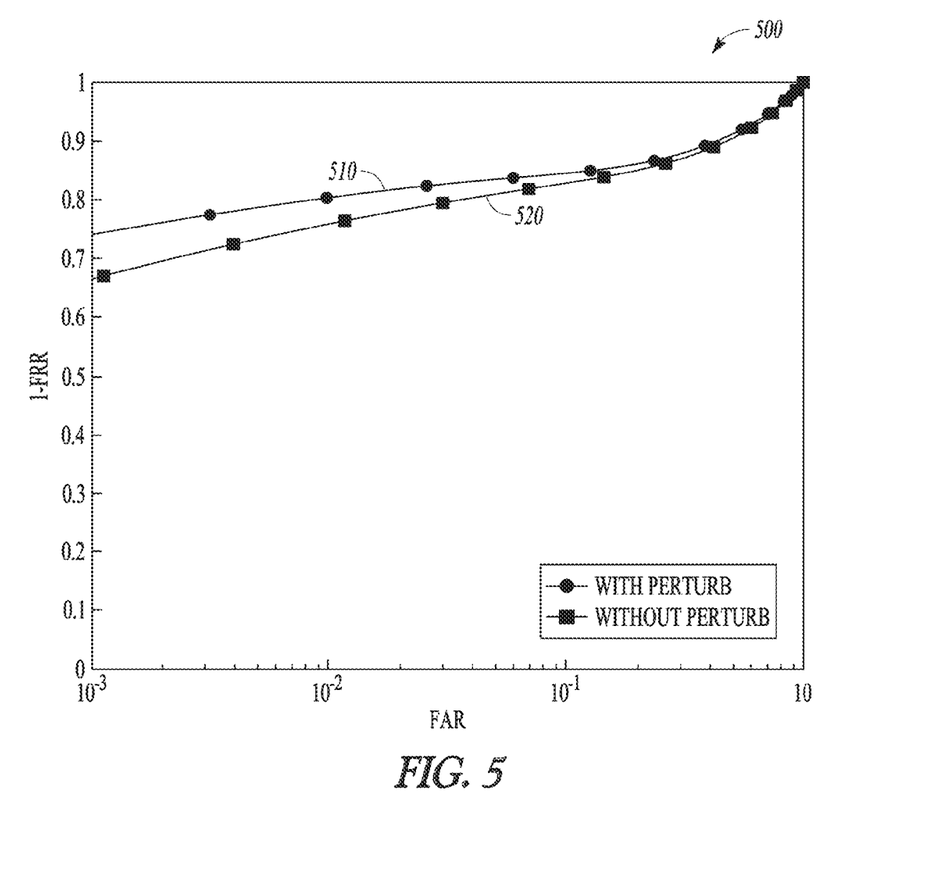
FIG. 5 is a graph illustrating matching results by using a grid with and without perturbation according to an example embodiment.

FIG. 5 illustrates a graph 500 showing an enhancement in matching results when a 3×3 grid is used. A line 510 shows the results with perturbation, and line 520 shows the results without perturbation. However, the number of matches that need to be made is prohibitively high for real-time systems. For example, if a 3×3 grid is used, and then close to 81 (9 positions in left eye and 9 positions in right eye) matches need to be computed and for a 5×5 grid, 625 matches need to be computed.

Figure 6:
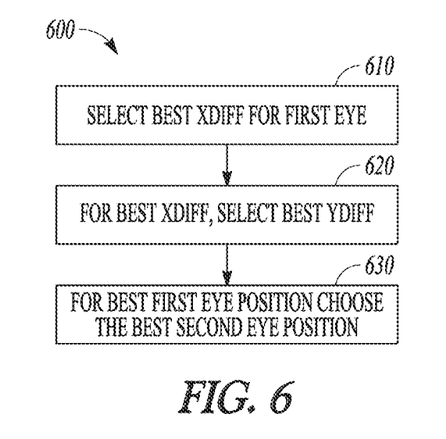
FIG. 6 is a flowchart illustrating an optimization procedure to search for optimal matches according to an example embodiment.

FIG. 6 is a flowchart illustrating an optimization procedure 600 to efficiently search for the optimal match as shown below for a 3×3 grid. At 610, the best xdiff is selected for the left eye (−1, 0, 1) resulting in three comparisons. At 620, for the best xdiff select the best ydiff, resulting in two comparisons. For the best left eye position, chose the best right eye position at 630. This results in five comparisons. Note that the procedure/process 600 may alternatively begin with the right eye. FIG. 6 utilizes a first eye and a second eye to refer to the eyes for generality.

The total number of comparisons is: 5+5=10, instead of 81 for a brute force search. For a 5×5 grid, the number of comparisons comes down to about 18 instead of 625.

Figure 7:
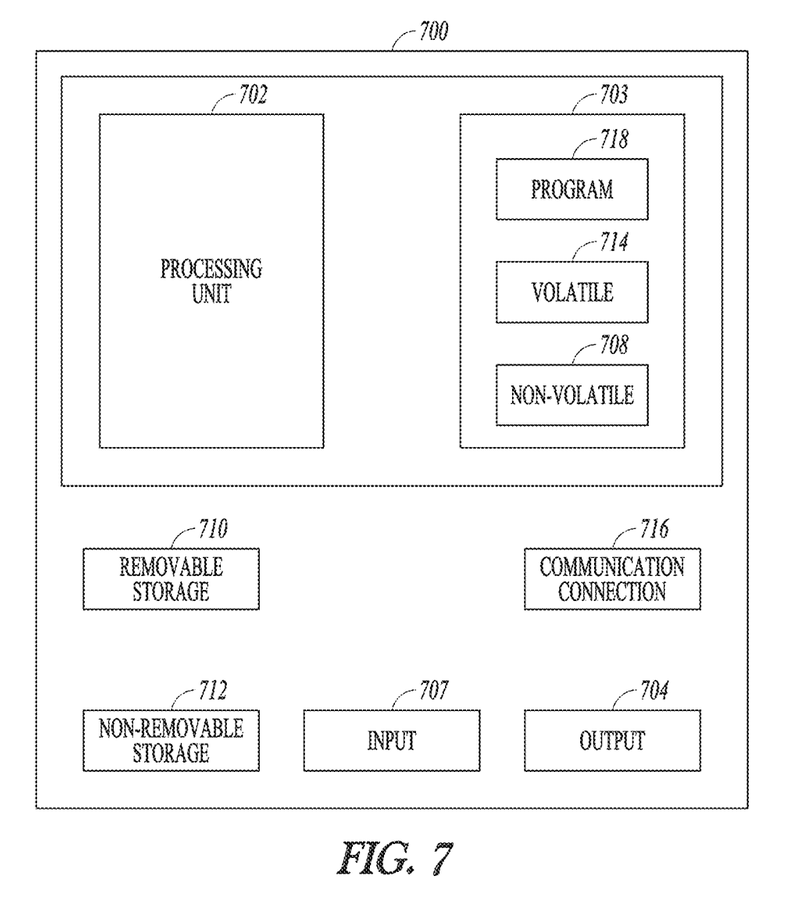
FIG. 7 is a block diagram of an example computer system for implementing one or more methods and algorithms according to example embodiments.

FIG. 7 is a block schematic diagram of a computer system 700 to implement algorithms according to an example embodiment. In one embodiment, multiple such computer systems are utilized in a distributed network to implement one or more methods. An object-oriented, service-oriented, or other architecture may be used to implement such functions and communicate between the multiple systems and components. One example computing device in the form of a computer 700, may include a processing unit 702, memory 703, removable storage 710, and non-removable storage 712. Memory 703 may include volatile memory 714 and non-volatile memory 708. Computer 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 700 may include or have access to a computing environment that includes input 706, output 704, and a communication connection 716. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 702 of the computer 700. A hard drive, CD-ROM, and RAM are some examples of articles including a non-transitory computer-readable medium. For example, a computer program 718 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 700 to provide generic access controls in a COM based computer network system having multiple users and servers.

Figure 8:
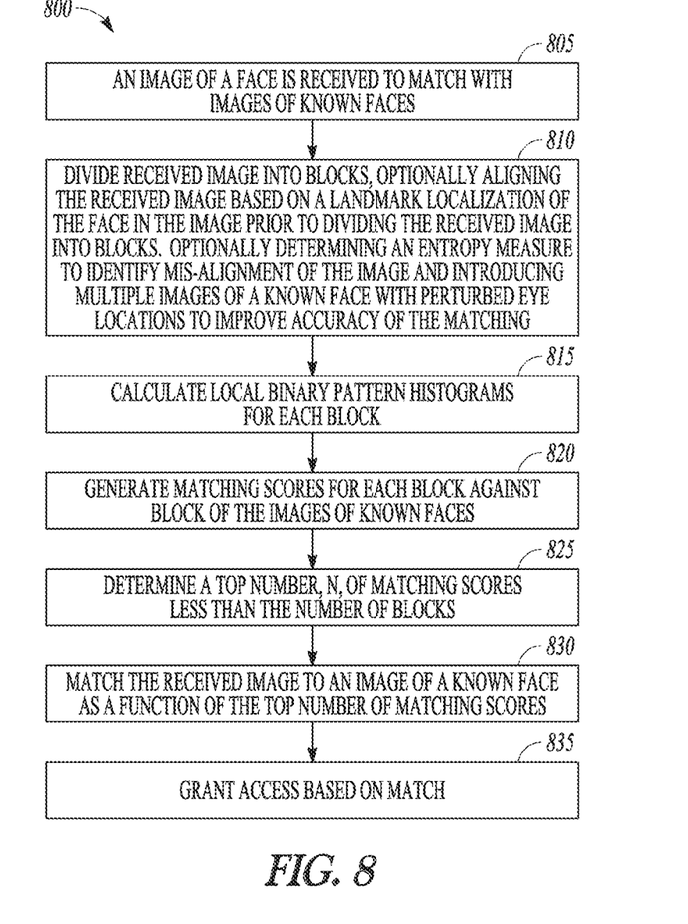
FIG. 8 is a flowchart illustrating method of matching a face according to an example embodiment.

FIG. 8 is a flowchart of a method 800 of matching a face. At 805, an image of a face is received to match with images of known faces. At 810, the received image is divided into blocks. Local binary pattern histograms are calculated for each block at 815. At 820, matching scores are generated for each block against block of the images of known faces. At 825, a top number, N, of matching scores less than the number of blocks is determined. The received image is then matched at 830 to an image of a known face as a function of the top number of matching scores. In one embodiment, access may be granted at 835 based on the match.

In a further embodiment, at 810, the received image is optionally aligned based on a landmark localization of the face in the image prior to dividing the received image into blocks. An entropy measure may also be determined to identify mis-alignment of the image of the face. Still further, multiple images of a known face with perturbed eye locations may optionally be introduced to improve accuracy of the matching.

The top number of matching scores may be determined as a function of the entropy measure. The blocks may include multiple overlapping and non-overlapping blocks.

Matching may be a function of the sum of the N scores, and N may be determined as a function resolution of the received image or as a function of landmark localization error.

Figure 9:
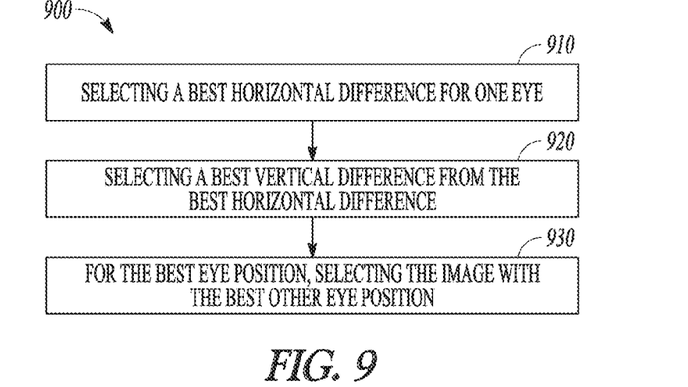
FIG. 9 is a flowchart illustrating a method of searching multiple images for a face match according to an example embodiment.

FIG. 9 is a flowchart illustrating a method 900 of searching among the multiple images for a known face by selecting at 910 a best horizontal difference for one eye. At 920, a best vertical difference is selected from the best horizontal difference. For the best eye position, the image with the best other eye position is selected at 930.

EXAMPLES

1. A method comprising:
   receiving an image of a face to match with images of known faces;
   extracting multiple blocks from the received image;
   calculating local binary pattern histograms for each block;
   generating matching scores for each block against block of the images of known faces;
   determining a top number, N, of matching scores less than the number of blocks; and
   matching the received image to an image of a known face as a function of the top number of matching scores.

2. The method of example 1 and further comprising granting access based on the match.

3. The method of any of examples 1-2 and further comprising aligning the received image based on a landmark localization of the face in the image prior to dividing the received image into blocks.

4. The method of example 3 and further comprising determining an entropy measure to identify misalignment of the image of the face.

5. The method of example 4 and further comprising introducing multiple images of a known face with perturbed eye locations to improve accuracy of the matching.

6. The method of example 5 and further comprising:
   searching among the multiple images for a known face by selecting a best horizontal difference for one eye, selecting a best vertical difference from the best horizontal difference; and for the best eye position, selecting the image with the best other eye position.

7. The method of any of examples 4-6 wherein the top number of matching scores is determined as a function of the entropy measure.

8. The method of any of examples 1-7 wherein the blocks include dividing the receiving image into multiple non-overlapping blocks.

9. The method of any of examples 1-8 wherein the blocks include dividing the receiving image into multiple overlapping blocks.

10. The method of any of examples 1-9 wherein the blocks include dividing the receiving image into different size blocks.

11. The method of any of examples 1-10 wherein matching is a function of the sum of the N scores.

12. The method of any of examples 1-11 wherein N is determined as a function resolution of the received image.

13. The method of any of examples 1-12 wherein N is determined as a function of landmark localization error.

14. A computer readable storage device having instructions for causing a computer to perform a method, the method comprising:
   receiving an image of a face to match with images of known faces;
   extracting multiple blocks from the received image;
   calculating local binary pattern histograms for each block;
   generating matching scores for each block against block of the images of known faces;
   determining a top number, N, of matching scores less than the number of blocks; and
   matching the received image to an image of a known face as a function of the top number of matching scores.

15. A system comprising:
   a module to receive an image of a face to match with images of known faces;
   a module to extract multiple blocks from the received image;
   a module to calculate local binary pattern histograms for each block;
   a module to generate matching scores for each block against block of the images of known faces;
   a module to determine a top number, N, of matching scores less than the number of blocks; and
   a module to match the received image to an image of a known face as a function of the top number of matching scores.

16. The system of example 13 and further comprising a database to store and provide access to the images of known faces.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
   receiving an image of a face to match with images of known faces;
   extracting multiple blocks from the received image;
   calculating local binary pattern histograms for each block;
   generating matching scores for each block against block of the images of known faces;
   determining a top number, N, of sorted matching scores less than the number of blocks; and
   matching the received image to an image of a known face as a function of the top number of matching scores.

2. The method of claim 1 and further comprising granting access based on the match.

3. The method of claim 1 and further comprising aligning the received image based on a landmark localization of the face in the image prior to dividing the received image into blocks.

4. The method of claim 3 and further comprising determining an entropy measure to identify misalignment of the image of the face.

5. The method of claim 4 and further comprising introducing multiple images of a known face with perturbed eye locations to improve accuracy of the matching.

6. The method of claim 5 and further comprising:
   searching among the multiple images for a known face by selecting a best horizontal difference for one eye, selecting a best vertical difference from the best horizontal difference; and for the best eye position, selecting the image with the best other eye position.

7. The method of claim 4 wherein the top number of matching scores is determined as a function of the entropy measure.

8. The method of claim 1 wherein the blocks include dividing the receiving image into multiple non-overlapping blocks.

9. The method of claim 1 wherein the blocks include dividing the receiving image into multiple overlapping blocks.

10. The method of claim 1 wherein the blocks include dividing the receiving image into different size blocks.

11. The method of claim 1 wherein matching is a function of the sum of the N scores.

12. The method of claim 1 wherein N is determined as a function resolution of the received image.

13. The method of claim 1 wherein N is determined as a function of landmark localization error.

14. A non-transitory computer readable storage device having instructions for causing a computer to perform a method, the method comprising:
   receiving an image of a face to match with images of known faces;
   extracting multiple blocks from the received image;
   calculating local binary pattern histograms for each block;
   generating matching scores for each block against block of the images of known faces;
   determining a top number, N, of sorted matching scores less than the number of blocks; and
   matching the received image to an image of a known face as a function of the top number of matching scores.

15. A system comprising:
   a processor; and
   a non-transitory storage device coupled to the processor to store software modules for execution on the processor, the software modules comprising:
   a module to receive an image of a face to match with images of known faces;
   a module to extract multiple blocks from the received image;
   a module to calculate local binary pattern histograms for each block;
   a module to generate matching scores for each block against block of the images of known faces;
   a module to determine a top number, N, of sorted matching scores less than the number of blocks; and
   a module to match the received image to an image of a known face as a function of the top number of matching scores.

16. The system of claim 13 and further comprising a database to store and provide access to the images of known faces.

\* \* \* \* \*